United States Patent
Buxton et al.

(12) 
(10) Patent No.: US 6,473,280 B1
(45) Date of Patent: Oct. 29, 2002

(54) SWITCHING VOLTAGE REGULATOR FAILURE DETECTION CIRCUIT AND METHOD

(75) Inventors: Joseph C. Buxton, Palo Alto, CA (US); Paul R. Collanton, Jr., Fremont, CA (US)

(73) Assignee: Analog Devices, Inc., Norwood, MA (US)

( * ) Notice: Subject to any disclaimer, the term of this patent is extended or adjusted under 35 U.S.C. 154(b) by 181 days.

(21) Appl. No.: 09/688,412

(22) Filed: Oct. 12, 2000

(51) Int. Cl.[7] .................................................. H02H 7/00
(52) U.S. Cl. ........................... 361/18; 361/78; 307/140; 323/282
(58) Field of Search ............................ 361/18, 78, 79, 361/93.1, 93.2, 83, 94, 89; 323/234, 283, 282, 284, 276; 307/139, 140

(56) References Cited

U.S. PATENT DOCUMENTS 5,208,720 A * 5/1993 Fraisse et al. ................ 361/94
5,774,321 A * 6/1998 Kim et al. ..................... 361/58
6,031,743 A * 2/2000 Carpenter et al. ............. 307/48
6,094,039 A * 7/2000 Farrenkopf ................. 323/283
6,229,292 B1 * 5/2001 Redl et al. .................. 323/224
6,329,801 B1 * 12/2001 Zuniga et al. .............. 323/282

* cited by examiner

Primary Examiner—Kim Huynh
(74) Attorney, Agent, or Firm—Koppel, Jacobs, Patrick & Heybl

(57) ABSTRACT

A failure detection scheme for switching voltage regulators senses a parameter which normally transitions above and below a predetermined threshold during each clock cycle. A decision circuit tracks the sensed parameter, and toggles an output when the sensed parameter transitions normally. A counter counts clock cycles, and toggles its output when a predetermined number is reached. The counter also has a reset input which receives the output of the decision circuit, and is reset to an initial value when the decision circuit output toggles. If the sensed parameter fails to transition normally, the reset input is not toggled and the count value increments with each clock cycle. If the failure persists for the predetermined number of clock cycles, the counter output toggles to indicate a failure, enabling the failed regulator to be repaired or replaced before additional failures occur.

30 Claims, 7 Drawing Sheets

United States Patent US 6,473,280 B1

SWITCHING VOLTAGE REGULATOR FAILURE DETECTION CIRCUIT AND METHOD

BACKGROUND OF THE INVENTION

1. Field of the Invention

This invention relates to the field of switching voltage regulators, and particularly to failure detection circuits for such regulators.

2. Description of the Related Art

Switching voltage regulators are widely employed due to their efficiency and low cost. A typical switching regulator is made from a pair of output transistors connected in series between an unregulated input voltage and ground, with an inductor connected between the junction of the two transistors and an output terminal. A controller alternately drives one or the other of the transistors to conduct, so that current is alternately conducted from the input voltage to the inductor, and from the inductor to ground. The voltage at the output terminal is regulated by adjusting the duty cycle of the complementary signals driving the two transistors.

It is often desirable to quickly detect when a switching regulator failure has occurred. For example, to increase "up" time, computer servers typically employ two or more switching regulators in parallel to provide redundant power. All the regulator outputs are bussed together and their respective regulators share the current load. If one regulator fails by, for example, no longer delivering its rated current to the server, the remaining regulators must make up the lost current. This can place undue stress on the remaining regulators which can lead to their failure, and eventually to failure of the server.

SUMMARY OF THE INVENTION

A circuit and method for detecting switching voltage regulator failures is presented, which is particularly advantageous when the outputs of multiple regulators are bussed together to provide a redundant power source.

The failure detection scheme is useful with either synchronous switching regulators—with an output stage having series-connected output transistors which are alternately driven on and off with every clock cycle, or non-synchronous regulators—with an output stage having a diode in series with an output transistor which is switched on and off with every clock cycle. The scheme requires sensing a parameter which, when the regulator is operating normally, transitions above and below a predetermined threshold during each clock cycle as the output transistors are switched on and off. A decision circuit tracks the sensed parameter, and produces an output which toggles during each clock cycle as long as the sensed parameter transitions above and below the threshold. A counter is connected to count the number of clock cycles that occur, and to toggle its output when a predetermined count is reached. The counter also has a reset input, which receives the output of the decision circuit. When the reset input is toggled by the decision circuit, the counter is reset to an initial value.

When the regulator is operating normally, the sensed parameter transitions above and below the predetermined threshold once per clock cycle. This causes the decision circuit output to toggle the reset input once per clock cycle, so that the counter never reaches the predetermined count and its output never toggles. If, however, a failure occurs which causes the sensed parameter to fail to transition above and below the threshold during a clock cycle, the reset input is not toggled and the count value increments during that clock cycle. If the failure persists for the predetermined number of clock cycles, the counter output toggles to signal a failure.

The failure detection circuit and method are particularly useful for a single multi-phase switching regulator, or when a number of switching regulators are connected in parallel to provide a redundant power source. In the latter case, each of the regulators is equipped with a respective failure detection circuit, and each of their respective counter outputs is monitored. If one of the regulators fails, as indicated by its counter output, the failed regulator can be replaced or the powered circuit turned off before additional failures occur.

Further features and advantages of the invention will be apparent to those skilled in the art from the following detailed description, taken together with the accompanying drawings.

BRIEF DESCRIPTION OF THE DRAWINGS

FIG. 1b is an alternative embodiment of the switching regulator of FIG. 1a.

DETAILED DESCRIPTION OF THE INVENTION

Figure 1A:
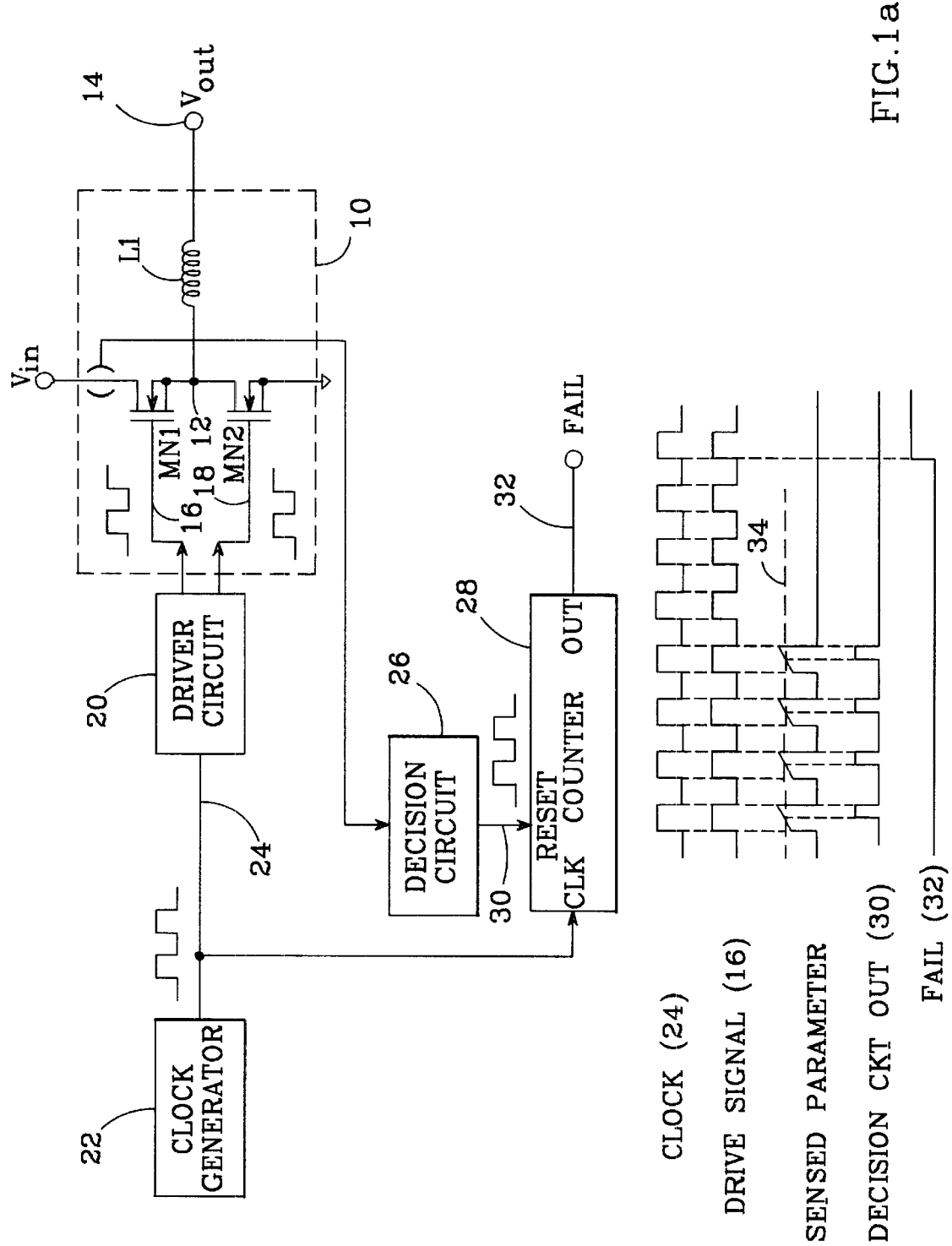
FIG. 1a is a schematic diagram and a timing diagram illustrating the basic principles of the invention.

The basic principles of the switching regulator failure detection circuit are illustrated in FIG. 1a. A conventional switching regulator output stage 10 includes a pair of output transistors MN1 and MN2 connected in series between an input voltage $V_{in}$ and ground, and an output inductor L1 which is connected between the junction 12 between MN1 and MN2 and an output terminal 14. The output transistors are driven with complementary drive signals 16 and 18, which are generated by a drive circuit 20. A clock generator circuit 22 provides a periodic clock signal 24 to driver circuit 20, from which drive signals 16 and 18 are derived.

Output transistors MN1 and MN2 are alternately driven to conduct by driver circuit 20; i.e., when MN1 is on, MN2 is off, and when MN2 is on, MN1 is off. Current is conducted from $V_{in}$ to L1 via MN1 when MN1 is on, and conducted from ground to L1 via MN2 when MN2 is on. The voltage $V_{out}$ at output terminal 14 is regulated by adjusting the duty cycle of drive signals 16 and 18, which is accomplished using a feedback network (not shown) connected between $V_{out}$ and driver circuit 20.

The present invention detects when a switching regulator having an output stage configured as in FIG. 1a fails to provide an acceptable output, supplying an output voltage or current that fails to meet the requirements of the device being powered, for example. This is accomplished with a decision circuit 26 and a counter 28. Decision circuit 26 is connected to sense a parameter which, when the regulator is operating normally, transitions above and below a predetermined threshold during each clock cycle as the output transistors are switched on and off. Examples of parameters which meet this requirement include the current in one of the output transistors, or the current in L1, which transition from a first value (when the transistor is on) to a second value (when the transistor is off) during every clock cycle. Decision circuit 26 determines whether the sensed parameter transitions above and below the predetermined threshold during each clock cycle. When the sensed parameter does this, indicating that the regulator is operating normally, the decision circuit is arranged to produce an output 30 which toggles from a first state to a second state for every cycle of the clock signal.

Counter 28 has a clock input, a reset input, and an output 32. The clock input is connected to receive the same clock signal 24 from which drive signals 16 and 18 are derived, and the reset input receives the output 30 of decision circuit 26. Unless reset by a signal at its reset input, the counter, starting from an initial value, increments its internal count value once per clock cycle; if the counter counts from its initial value to a predetermined count value, counter output 32 is toggled. The counter is reset to the initial value when a signal at its reset input toggles from a high state to a low state.

As noted above, when the parameter sensed by decision circuit 26 transitions above and below the predetermined threshold during a clock cycle, the decision circuit's output 30 toggles from a high state to a low state. Thus, under normal operating conditions, the reset input of counter 28 receives a proper reset signal once per clock cycle, thereby resetting the counter to the initial value on every cycle and preventing the counter output 32 from toggling. If, however, the sensed parameter fails to transition above and below the predetermined threshold, decision circuit output 30 ceases to toggle and, if the failure condition persists for a number of clock cycles equal to the predetermined count minus the initial value, causes counter output 32 to toggle. Thus, the toggling of counter output 32 indicates that a failure has occurred; as such, output 32 is labeled FAIL.

A timing diagram illustrating the above-described sequence of events is shown in FIG. 1a. The top trace is clock signal 24; a clock cycle is defined as the period between consecutive rising edges. Drive signal 16 is derived from clock signal 24, and drives MN1 on and off. Initially, the regulator is operating normally: the sensed parameter (here, the current in MN1) is transitioning above and below a predetermined threshold 34 once per clock cycle. The decision circuit output 30 toggles from a high state to a low state during each of the first four clock cycles, indicating that the sensed parameter transitioned normally during those cycles. With decision circuit output 30 toggling as shown, counter 28 is repeatedly reset to its initial value, and thus counter output 32 does not toggle.

However, after the first four cycles, the sensed parameter stops transitioning above and below threshold 34. Decision circuit 26 detects this, and stops toggling its output 30 in response. With output 30 not toggling, counter 28 is not reset. Assuming that the predetermined count is four (and the initial value is zero), counter output 32 toggles and indicates a failure when the failure condition has persisted for four consecutive cycles of clock signal 24.

Note that it is not necessary that the sensed parameter stop toggling for a failure to be indicated. It is only necessary that the parameter fail to transition above and below the predetermined threshold for output 30 to stop toggling. For example, assume the sensed parameter is the current in MN1, which, when the regulator is operating normally, swings between 2 amps when MN1 is on and 0 amps when MN1 is off. Further assume that predetermined threshold 34 is set at 1.75 amps. If MN1's current only ramps up to 1.5 amps during a given clock cycle, threshold 34 will not be cleared and output 30 will not toggle during that cycle; as a result, counter 28 will not be reset and its count will increase by one. However, no failure will be indicated unless the sensed current fails to transition above and below the threshold for the predetermined number of counts.

Also note that the signal polarities and counter operation are not limited to those described above. For example, the output of decision circuit 26 may toggle from low to high when the sensed parameter transitions above and below the predetermined threshold (rather than high to low as described above), if the counter is arranged to reset upon receipt of a low-to-high going signal. Similarly, instead of counter output 32 toggling from low to high upon reaching the predetermined count, it may toggle from high to low. The initial value to which the counter is reset may be zero, or, if the counter has a loadable count feature, to a user-defined value. Counter output 32 may toggle when counter 28 overflows, or a particular count value might be detected using external logic gates. It is also not essential that counter 28 increment its count when clocked; a down counter could also be employed to count the number of clock cycles that transpire while a failure condition exists.

Figure 1B:
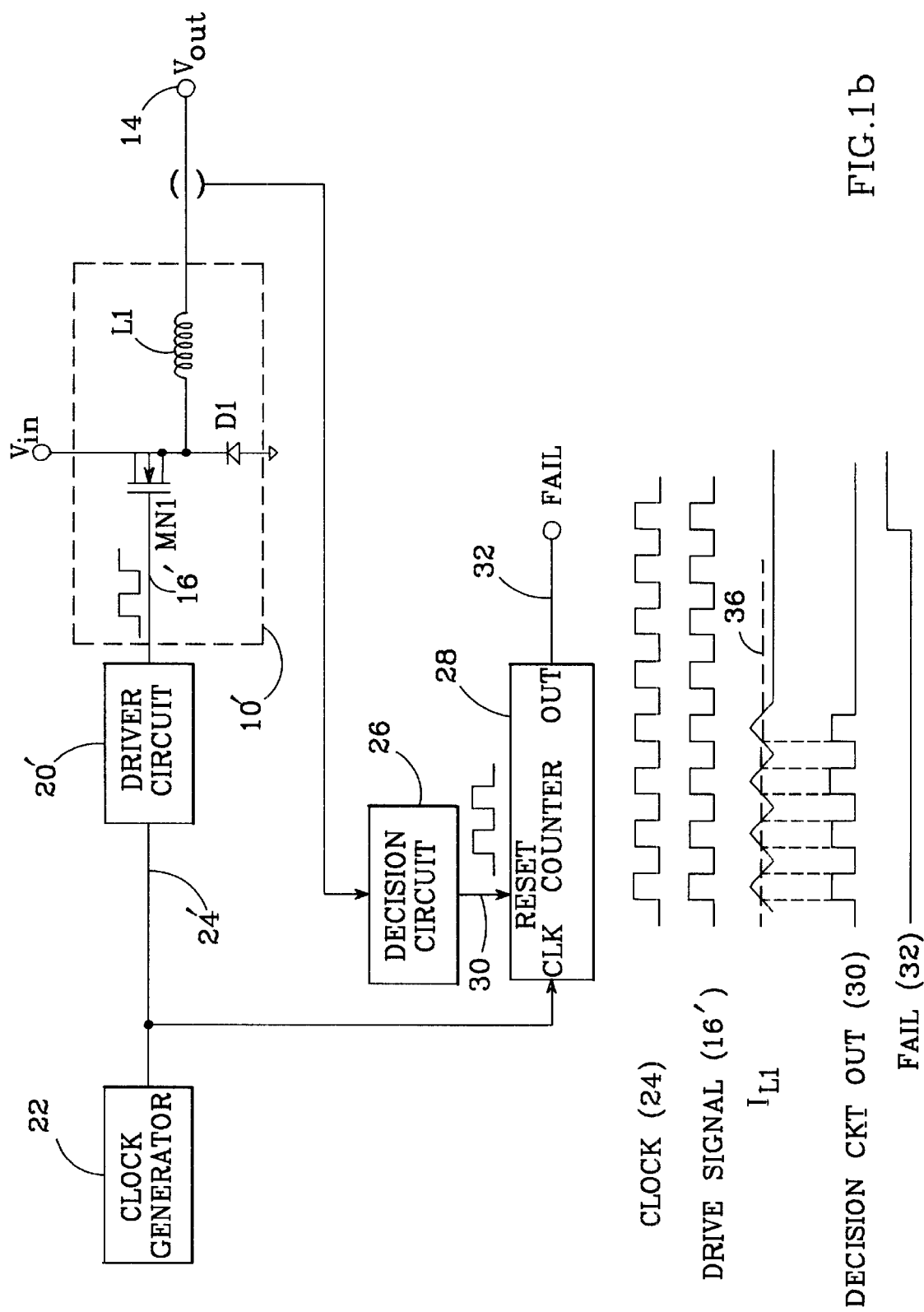

An alternative embodiment of the regulator of FIG. 1a is shown in FIG. 1b. Here, the output stage 10' comprises output transistor MN1 connected in series with a diode D1 between $V_{in}$ and ground; current is conducted from $V_{in}$ to L1 via MN1 when MN1 is on, and from ground to L1 via D1 when MN1 is off. MN1 is driven with a drive signal 16', which is derived from clock signal 24 by driver circuit 20'. The invention is equally applicable to this non-synchronous regulator, as it also presents parameters that transition above and below a threshold in normal operation. For example, the current in MN1 could be monitored as in FIG. 1a. Alternatively, the current in L1 ($I_{L1}$) could be monitored, as shown in FIG. 1b. As seen in the FIG. 1b timing diagram, $I_{L1}$ ramps up when MN1 is switched on and ramps down when MN1 is switched off. A threshold 36 is defined such that, when the regulator is operating normally, $I_{L1}$ transitions above and below the threshold during each clock cycle. This causes decision circuit output 30 to toggle as before, resetting counter 28 and keeping the FAIL output low. However, if $I_{L1}$ stops transitioning above and below threshold 36 for the predetermined number of counts, FAIL output 32 toggles to indicate a failure.

Figure 2A:
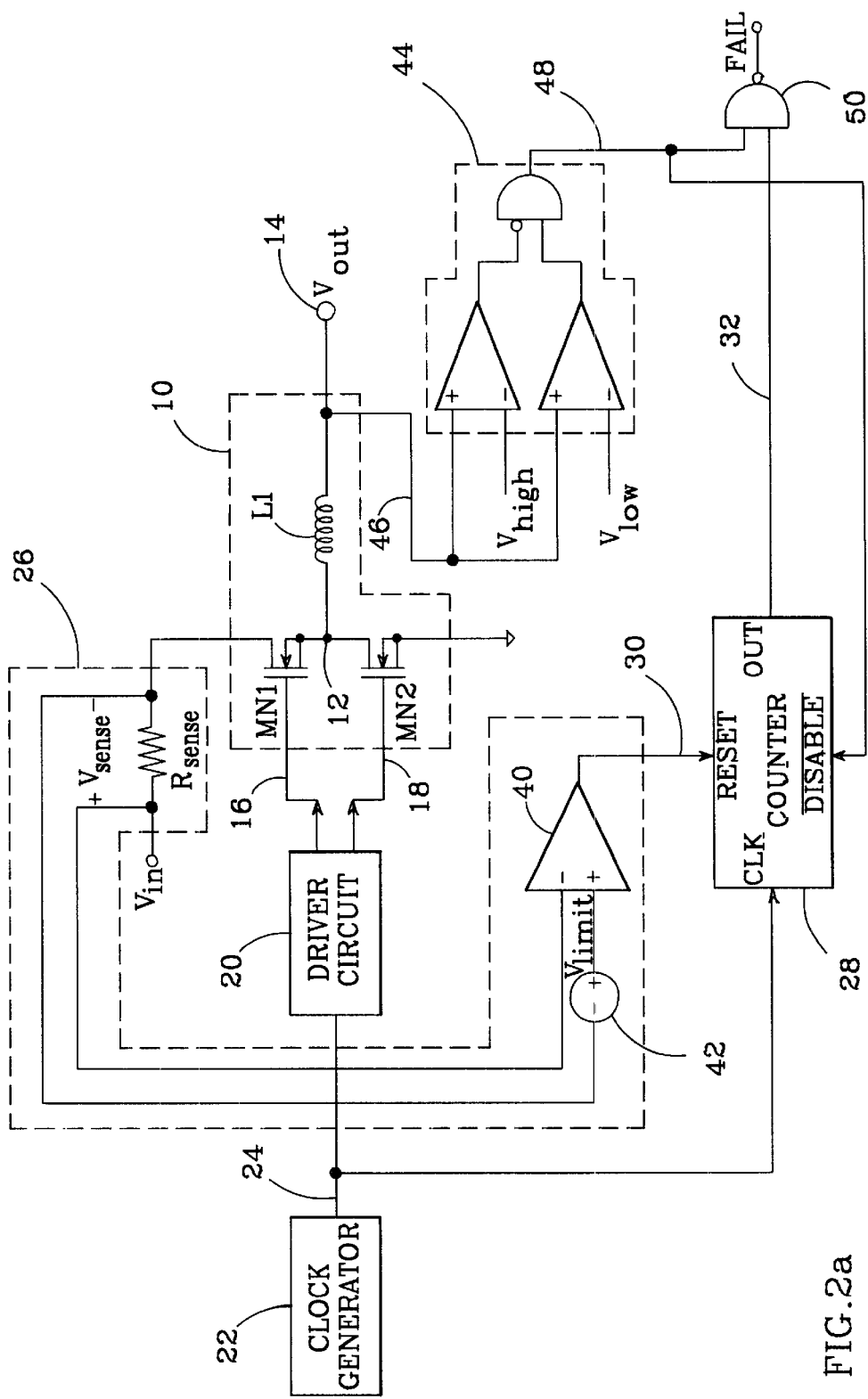
FIG. 2a is a schematic diagram of one embodiment of a switching regulator with a failure detection circuit per the present invention.

A more detailed implementation of one possible embodiment of a switching regulator with a failure detection circuit is shown in FIG. 2a. Output stage 10 is as before, with output transistors MN1 and MN2 connected together at a junction 12 and an output inductor L1 connected between junction 12 and output terminal 14. Driver circuit 20 receives clock signal 24 from clock generator 22, and provides complementary drive signals 16 and 18 to MN1 and MN2, respectively.

In this exemplary embodiment, decision circuit 26 is implemented with a current sense resistor $R_{sense}$, which is used to sense the current in output transistor MN1. When driven to conduct, the MN1 current develops a voltage $V_{sense}$ across $R_{sense}$, which falls to zero or near-zero when MN1 is driven off. $V_{sense}$ is connected to a comparator 40, which also receives the output $V_{limit}$ of a voltage source 42 at one of its inputs. The output of comparator 40 is the decision circuit output 30: output 30 toggles from low to high when $V_{sense}$ falls below $V_{limit}$, and toggles from high to low when $V_{sense}$ rises above $V_{limit}$. In this way, $V_{limit}$ establishes the predetermined threshold for the sensed parameter: to inhibit the counter from counting, $V_{sense}$ must ramp to be greater than $V_{limit}$ when MN1 is on, and less than $V_{limit}$ when MN1 is off. Of course, if necessary for proper operation, the polarity of decision circuit output 30 can be reversed by reversing the comparator's input connections.

Voltage source 42 can be fixed or variable. Switching regulators are often required to provide different output currents under different load conditions, such as when the device being powered is switched from a "standby" mode to an "active" mode. In such a case, it may be desirable to make voltage source 42 variable, so that $V_{limit}$ can change with a varying load.

Figure 2B:
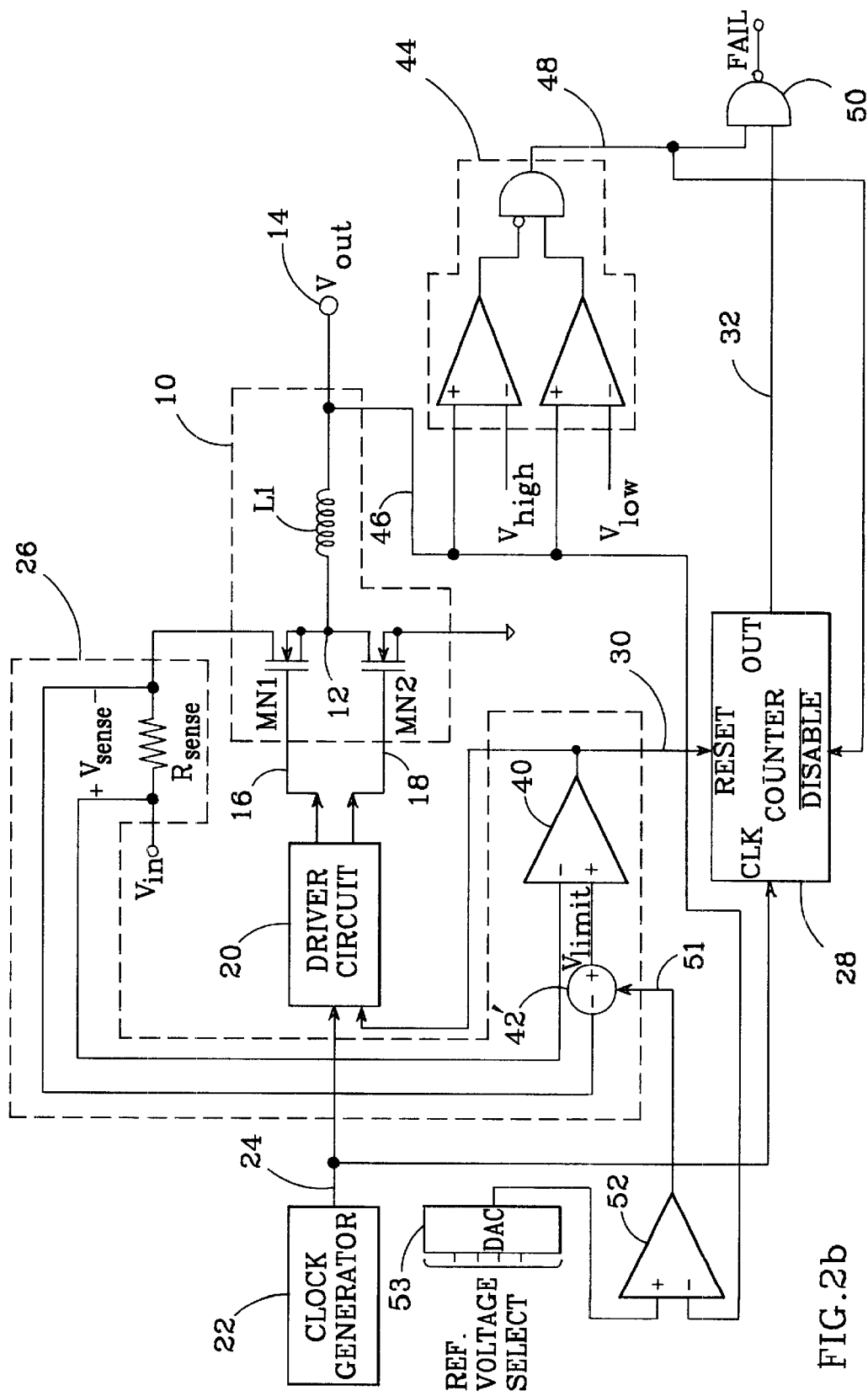
FIG. 2b is a schematic diagram of another embodiment of a switching regulator with a failure detection circuit per the present invention.

One possible implementation of a regulator which employs a variable voltage source 42' is shown in FIG. 2b. Voltage source 42' is arranged to vary its output $V_{limit}$ in accordance with a control input 51, which is manipulated to adjust $V_{limit}$ as necessary to accommodate a varying load.

As shown in FIG. 2b, comparator 40 can be used to serve an integral role in the regulator's control loop, providing its output 30 to driver circuit 20 as well as to counter 28. Here, control input 51 is manipulated to vary $V_{limit}$ as necessary to provide a desired output voltage $V_{out}$, while also establishing the threshold for the fault detection circuit. Driver circuit 20 is arranged to vary drive signals 16 and 18 in response to comparator output 30 to obtain the desired output voltage. Control input 51 can be provided, for example, by an operational amplifier 52 which receives a signal representative of output voltage $V_{out}$ at one input, a programmable reference voltage at its other input, and provides an output to control input 51 which varies with the difference between its two inputs. The programmable reference voltage is suitably provided by a digital-to-analog converter (DAC) 53, which is programmed by application of an appropriate digital word on its input lines.

As noted above, the invention is equally useful if a parameter other than the current in the upper output transistor is sensed. As long as the parameter transitions above and below a threshold during each clock cycle (when operating normally), it can be compared with a value such as $V_{limit}$, and thus employed as the sensed parameter.

In addition to sensing a parameter such as the current in an output transistor, it may also be desirable to monitor the regulator's output voltage $V_{out}$ to provide further information regarding the regulator's operation. As illustrated in FIGS. 2a and 2b, this can be accomplished with the use of a window comparator 44. The window comparator receives a signal 46 representative of the output voltage $V_{out}$, as well as signals $V_{high}$ and $V_{low}$ which represent upper and lower boundaries for signal 46; window comparator 44 toggles an output 48 when $V_{out}$ falls outside the range defined by $V_{high}$ and $V_{low}$. The output 48 can be read independently to determine the status of $V_{out}$, or, as shown in FIGS. 2a and 2b, can be combined with counter output 32 using a gate 50 to indicate that $V_{out}$, the current in MN1, or both are out of their respective ranges. As $V_{out}$ is likely to be out-of-range when the regulator is first powered up, the window comparator output 48 can be connected to a disable input on counter 28, to prevent false counting during startup.

Figure 3:
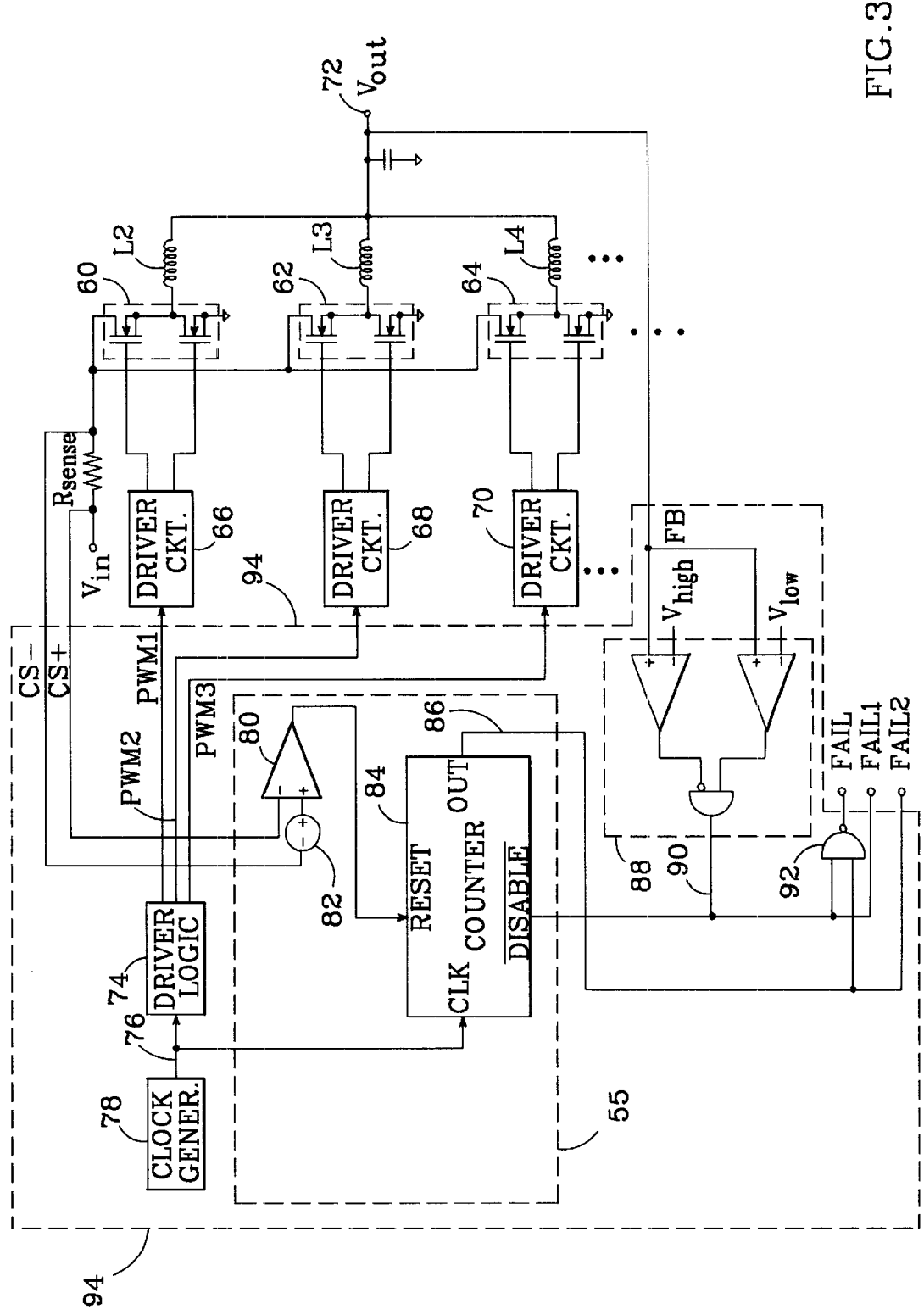
FIG. 3 is a schematic diagram of an embodiment of a multiple-phase switching regulator with a failure detection circuit per the present invention.

To provide redundancy, power sources can be arranged in a multiple-phase configuration, with each phase capable of supplying the needs of the device being powered. An exemplary three-phase power source which incorporates a failure detection circuit 55 per the present invention is shown in FIG. 3. The power source has three pairs of output transistors 60, 62, 64, each of which is connected to a respective output inductor L2, L3, L4 and driven with a respective driver circuit 66, 68, 70. The output sides of the three inductors are connected together at an output terminal 72. The power source is preferably designed so that if one phase fails, the remaining phases are capable of providing the needed power. The phases are activated in turn, in accordance with control signals PWM1, PWM2 and PWM3 received from a driver logic circuit 74 and derived from a clock signal 76 received from a clock generator circuit 78.

Resistor $R_{sense}$ is connected between input voltage $V_{in}$ and the upper transistor of each of the three transistor pairs. When so connected, the voltage across $R_{sense}$ represents the current in the upper output transistor of the currently-active phase. The voltage across $R_{sense}$ is fed to failure detection circuit 55, which includes a comparator 80 having a fixed or variable voltage source 82 connected to one of its inputs, and a counter 84. The voltage across $R_{sense}$ is connected to the comparator inputs, and the comparator output is fed to the reset input of counter 84. Counter 84 also receives clock signal 76 from clock generator 78, and produces an output 86 which toggles when the counter counts from an initial value to a predetermined count value. As before, the toggling of counter output 86 indicates that the sensed parameter has failed to transition above and below the threshold set by voltage source 82 for a number of clock cycles equal to the predetermined count minus the initial value.

An output voltage monitoring circuit as discussed above may also be employed in a multiple-phase configuration; an example is shown in FIG. 3: a window comparator 88 receives a signal representing output voltage $V_{out}$ as an input, along with upper and lower boundary voltages $V_{high}$ and $V_{low}$, and produces an output 90 which toggles when $V_{out}$ is outside the range established with $V_{high}$ and $V_{low}$. Output 90 may be connected to a disable input on counter 84 to prevent false counting during startup.

Either or both of counter output 86 and window comparator output 90 may be brought out as separate fail signals FAIL1 and FAIL2, respectively. Alternatively, or additionally, the two outputs can be combined together with a gate 92 to provide a single failure signal FAIL. If brought out separately, FAIL2 indicates a failure condition for the sensed parameter in at least one of the phases, while FAIL1 indicates an out-of-range condition for output voltage $V_{out}$.

Failure detection circuit 55, driver logic circuit 74, clock generator circuit 78, and output voltage monitoring circuit 88 may be conveniently grouped together on a common module 94, with output transistor pairs 60, 62, 64, output inductors L2, L3, L4, driver circuits 66, 68, 70, and current sense resistor $R_{sense}$ being external to module 94. $R_{sense}$ is connected to comparator 80 via module inputs CS+ and CS−, driver circuits 66, 68, 70 are connected to driver logic circuit 74 via module outputs PWM1, PWM2, PWM3, and $V_{out}$ is connected to window comparator 88 via module input FB.

Figure 4:
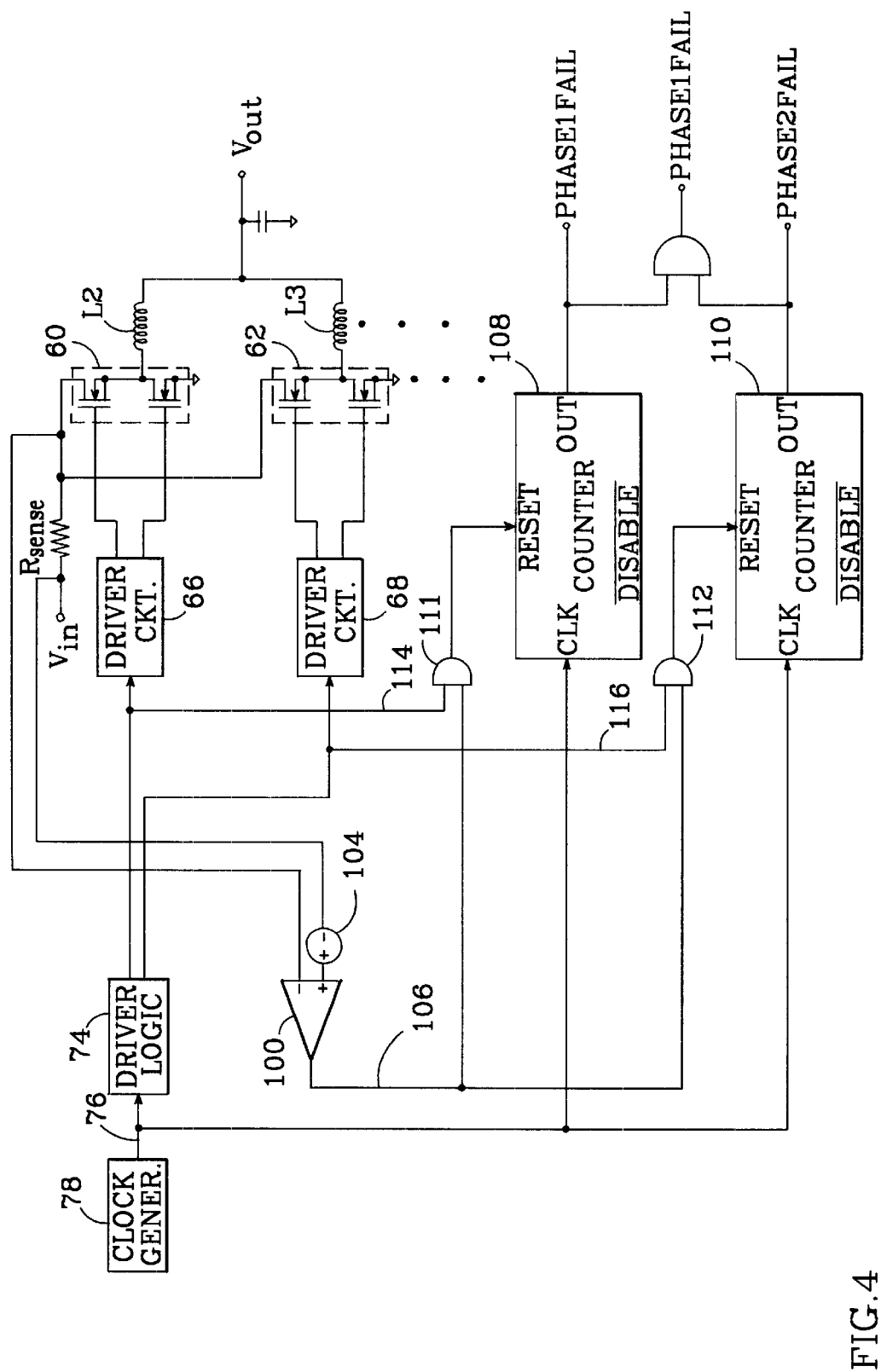
FIG. 4 is a schematic diagram of an embodiment of a multiple-phase switching regulator that includes one failure detection circuit per phase.

When one failure detection circuit is used for all three phases (as shown in FIG. 3), the toggling of counter output 86 indicates a failure condition for the sensed parameter in at least one of the three phases. When it is desirable to identify the specific phase in which a failure occurs, separate failure detection for each of the phases may be employed; this is illustrated in FIG. 4 for a two-phase configuration. Output transistor pairs 60 and 62 are as in FIG. 3, connected to inductors L2 and L3 and driven by driver circuits 66 and 68, respectively. The driver circuits are in turn controlled by driver logic circuit 74, which receives clock signal 76 from clock generator 78. Resistor $R_{sense}$ is connected between $V_{in}$ and the upper transistor of each of pairs 60 and 62. The voltage across $R_{sense}$ is connected to a comparator 100, which has a fixed or variable voltage source 104 connected to one of its inputs and which produces an output 106.

To enable the phase in which a failure occurs to be identified, two counters 108 and 110 are used, the reset inputs of which are connected to respective AND gates 111 and 112; both counters receive clock signal 76 at their clock inputs. Gate 111 receives a logic signal 114 from driver logic circuit 74 which indicates when the first phase (pair 60) is active, and gate 112 receives a logic signal 116 which indicates when the second phase (pair 62) is active. Both gates receive the output 106 of comparator 100. In this way, only the counter for the active phase is reset by comparator output 106.

When so configured, counter 108 produces an output PHASE1FAIL which toggles when the current in the upper transistor of pair 60 fails to transition above and below the threshold defined by voltage source 104 for a predetermined number of counts. Similarly, counter 110 produces an output PHASE2FAIL which toggles when the current in the upper transistor of pair 62 fails to transition above and below the threshold for a predetermined number of counts. This configuration enables a failure in either phase of the regulator to be independently detected and reported. PHASE1FAIL and PHASE2FAIL can also be AND'ed together to produce a single output PHASEFAIL which signals a failure in one of the phases.

Note that for this multiple counter failure detection scheme to operate properly, the number of clock cycles each counter must count before toggling its output must be greater than the number of phases. If the predetermined count minus the initial value is less than the number of phases, the clock inputs of counters 108 and 110 should also be AND'ed with logic signals 114 and 116, so that they are only clocked when their corresponding phases are active. Alternatively, each phase could employ a separate current sense resistor, comparator, and counter. Though the latter implementation requires more components, it also permits the predetermined ranges and counts to be individually established for each of the individual phases.

Figure 5:
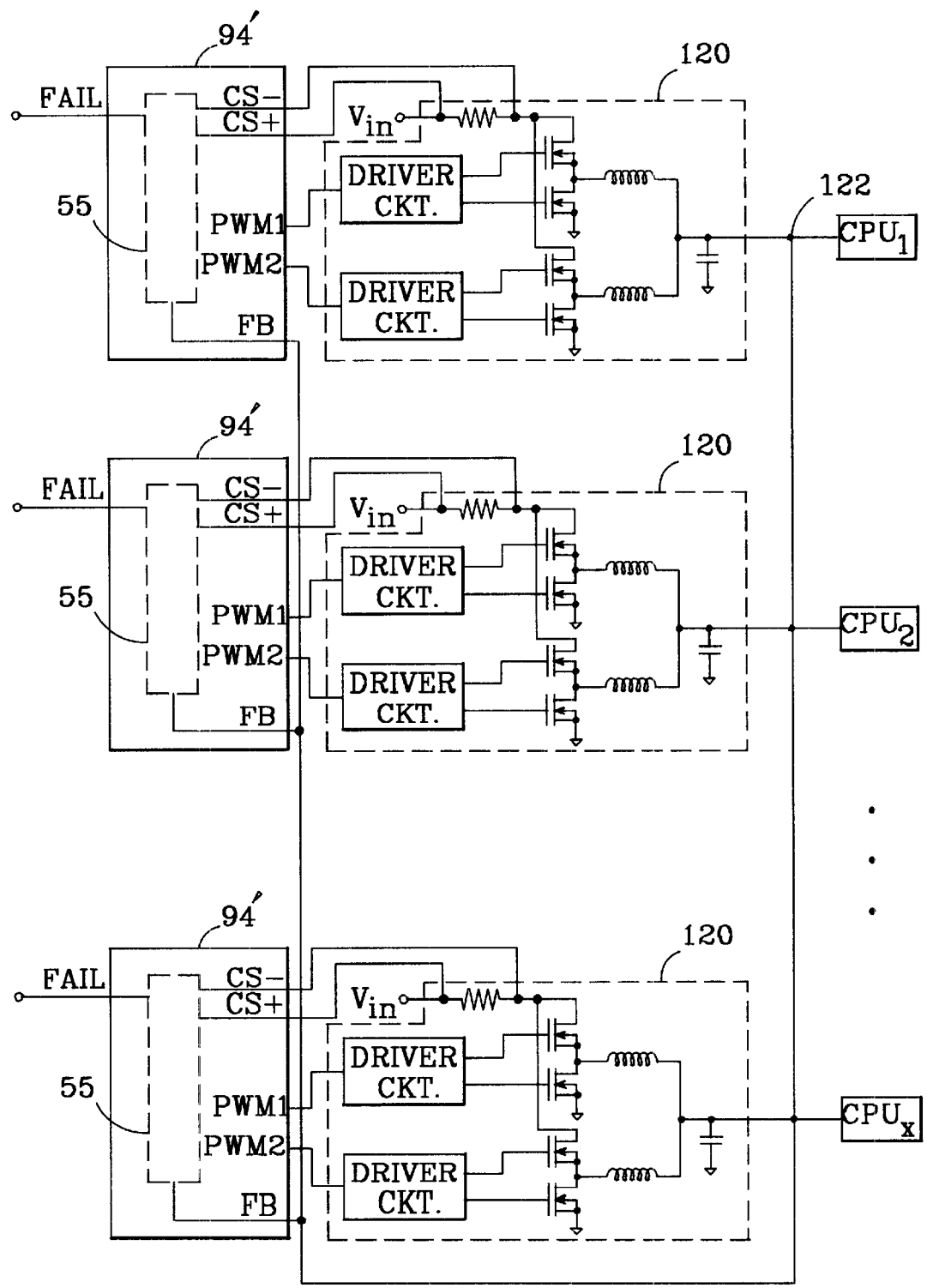
FIG. 5 is a schematic diagram of a redundant power source which includes multiple switching regulators, each of which includes a failure detection circuit per the present invention.

A number of modules 94' can be used in parallel to provide another level of power source redundancy, as illustrated in FIG. 5. Each of modules 94' are identical to module 94 shown in FIG. 3, except that each is configured to drive a two-phase output circuit rather than a three-phase output circuit. A redundant power source is formed by connecting the modules to respective external circuits 120, the outputs of which are connected together at an output terminal 122. A device or devices to be powered, such as a number of CPUs $CPU_1$, $CPU_2$, . . . , $CPU_x$ as might be found in a computer server application, are connected to output terminal 122. The modules include respective failure detection circuits 55 which produce respective FAIL outputs. Each FAIL output indicates the status of its respective "slice" (i.e., a module 94' and its respective external circuit 120) of the power source. When so configured, the individual FAIL outputs can be monitored, and a failed slice replaced or repaired before additional portions of the power source, or the powered device itself, fail.

While particular embodiments of the invention have been shown and described, numerous variations and alternate embodiments will occur to those skilled in the art. Accordingly, it is intended that the invention be limited only in terms of the appended claims.

We claim:

1. A switching voltage regulator failure detection circuit, said failure detection circuit comprising:

a clock generator which outputs a periodic clock signal, a driver circuit which, during each cycle of said clock signal, drives an output transistor of a switching regulator on and off to conduct current to an output inductor to provide a regulated output voltage, a decision circuit connected to sense a parameter which, when said switching regulator is operating normally, transitions above and below a predetermined threshold during each cycle of said clock signal as said output transistor is driven on and off, and to produce a decision circuit output which toggles from a first state to a second state and back to said first state for every cycle of said clock signal as long as said sensed parameter transitions above and below said predetermined threshold during said clock cycle, and a counter having a clock input connected to receive said clock signal, a reset input connected to receive said decision circuit output, and a counter output, said counter arranged to count the clock cycles received at said clock input and to toggle said counter output when said counter has counted from an initial value to a predetermined count value, said counter reset to said initial value when said decision circuit output toggles from said first state to said second state, said counter toggling its output when said decision circuit output fails to toggle for a consecutive number of clock cycles equal to said predetermined count minus said initial value, said counter output thereby indicating when said sensed parameter failed to transition above and below said predetermined threshold during a clock cycle for a consecutive number of clock cycles equal to said predetermined count minus said initial value.

2. The failure detection circuit of claim 1, wherein said decision circuit is connected to sense the current in said output transistor.

3. The failure detection circuit of claim 1, wherein said decision circuit is connected to sense the current in said output inductor.

4. The failure detection circuit of claim 1, wherein said decision circuit comprises a current sense resistor connected in series with said output transistor such that said sensed parameter is the current in the output transistor to which said current sense resistor is connected, and a comparator having its inputs connected across said current sense resistor, said decision circuit also comprising a bias voltage source which provides a threshold voltage to one of said comparator inputs, said threshold voltage being said predetermined threshold, the output of said comparator toggling from said first state to said second state when the voltage across said current sense resistor falls below said threshold voltage and toggling from said second state to said first state when the voltage across said current sense resistor rises above said threshold voltage, said comparator output being said decision circuit output.

5. The failure detection circuit of claim 4, wherein said bias voltage source provides a fixed threshold voltage to said comparator.

6. The failure detection circuit of claim 4, wherein said bias voltage source is arranged to receive a signal at a control input and to vary said threshold voltage in accordance with said signal such that said predetermined threshold can be varied to accommodate different values of said sensed parameter.

7. The failure detection circuit of claim 6, wherein said driver circuit varies the drive to said output transistor in response to the output of said comparator to regulate said output voltage.

8. The failure detection circuit of claim 7, further comprising an operational amplifier which provides said signal to said control input in accordance with the difference between said regulated output voltage and a programmable reference voltage.

9. The failure detection circuit of claim 8, further comprising a digital-to-analog converter which provides said programmable reference voltage.

10. The failure detection circuit of claim 1, further comprising a window comparator connected to receive a signal representing said output voltage and to toggle an output when said output voltage is outside of a predetermined range, and an OR circuit connected to receive said counter output and said window comparator output as inputs and to toggle an output when either of said inputs toggles.

11. The failure detection circuit of claim 10, wherein said counter includes a disable input which, when toggled, prevents said counter from counting, said disable input connected to receive said window comparator output such that said counter is prevented from counting when said output voltage is outside of said predetermined range.

12. The failure detection circuit of claim 1, further comprising said output transistor, a diode, and said output inductor, said output transistor and said diode connected in series between a first supply voltage and ground and said output inductor connected between the junction of said output transistor and said diode and an output terminal such that current is conducted from said first supply voltage to said output inductor when said output transistor is on and current is conducted through said diode to said output inductor when said output transistor is off, said output transistor's control input connected to said driver circuit and said driver circuit arranged to drive said output transistor on and off to provide said output voltage at said output terminal.

13. The failure detection circuit of claim 1, further comprising upper and lower output transistors and said output inductor, said output transistors' respective control inputs connected to said driver circuit and their respective current circuits connected in series between a first supply voltage and ground, said output inductor connected between the junction of said upper and lower output transistors and an output terminal, said driver circuit arranged to alternately drive said upper output transistor to conduct current from said first supply voltage to said output inductor with said lower output transistor driven off and to drive said lower output transistor to conduct current from ground to said output inductor with said upper output transistor driven off to provide said output voltage at said output terminal.

14. A switching voltage regulator failure detection circuit, said failure detection circuit comprising:
a clock generator which outputs a clock signal,
a driver circuit which, in response to said clock signal, alternately drives upper and lower output transistors of a switching regulator on and off to conduct current to an output inductor to provide a regulated output voltage,
a current sense resistor connected in series with the current circuit of said upper output transistor such that, when said switching regulator is operating normally, the voltage across said resistor transitions above and below a predetermined threshold during each cycle of said clock signal as said upper output transistor is driven on and off,
a comparator circuit connected across said current sense resistor and arranged to produce a comparator circuit out-put which toggles from a first state to a second state and back to said first state for every cycle of said clock signal as long as the voltage across said current sense resistor transitions above and below said predetermined threshold during said clock cycle, and
a counter having a clock input connected to receive said clock signal, a reset input connected to receive said comparator circuit output, and a counter output, said counter arranged to count the clock cycles received at said clock input and to toggle said counter output when said counter has counted from an initial value to a predetermined count value, said counter reset to said initial value when said comparator output toggles from said first state to said second state, said counter toggling its output when said comparator output fails to toggle from said first state to said second state for a consecutive number of clock cycles equal to said predetermined count minus said initial value, said counter output thereby indicating when the voltage across said current sense resistor failed to transition above and below said predetermined threshold during a clock cycle for a consecutive number of clock cycles equal to said predetermined count minus said initial value.

15. The failure detection circuit of claim 14, further comprising said upper and lower output transistors and said output inductor, said output transistors' respective control inputs connected to said driver circuit and their respective current circuits connected in series between a first supply voltage and ground, said output inductor connected between the junction of said upper and lower output transistors and an output terminal, said driver circuit arranged to alternately drive said upper output transistor to conduct current from said first supply voltage to said output inductor with said lower output transistor driven off and to drive said lower output transistor to conduct current from ground to said output inductor with said upper output transistor driven off to provide said output voltage at said output terminal.

16. The failure detection circuit of claim 15, wherein said upper and lower output transistors, said driver circuit, and said output inductor comprise a first output phase, further comprising additional output phases, each of which comprises an upper output transistor and a lower output transistor connected in series between said first supply voltage and ground and having an output inductor connected between the junction of said upper and lower transistors and said output terminal and driven by a respective driver circuit arranged to alternately drive said upper output transistor to conduct current from said first supply voltage to said output inductor with said lower output transistor driven off and to drive said lower output transistor to conduct current from ground to said output inductor with said upper output transistor driven off to provide said output voltage at said output terminal, said switching regulator arranged to activate said output phases one at a time in a repeating sequence,
said current sense resistor connected in series with the upper transistor of each of said phases so that said failure detection circuit detects a failure in any phase while it is active.

17. The failure detection circuit of claim 16, further comprising respective ones of said counters for each of said output phases, each of said counters connected to receive said clock signal, each counter's reset input connected to receive a reset signal generated by gating said comparator output with a logic signal which indicates when the counter's corresponding output phase is active such that only the counter for the active output phase is reset by said comparator output, each counter output thereby indicating the occurrence of a failure in the counter's corresponding output phase.

18. The failure detection circuit of claim 17, further comprising a circuit which receives all of said counter outputs and produces an output which indicates a failure in any of said output phases.

19. The failure detection circuit of claim 14, further comprising a window comparator connected to receive a signal representing said output voltage and a pair of signals establishing upper and lower boundaries for said output voltage, said window comparator arranged to toggle an output when said output voltage is outside the range defined by said upper and lower boundaries, and an OR circuit connected to receive said counter output and said window comparator output as inputs and to toggle an output when either of said inputs toggles.

20. The failure detection circuit of claim 19, wherein said counter includes a disable input which, when toggled, prevents said counter from counting, said disable input connected to receive said window comparator output such that said counter is prevented from counting when said output voltage is outside of said predetermined range.

21. The failure detection circuit of claim 14, wherein said comparator circuit further comprises a bias voltage source which provides a threshold voltage to one of said comparator inputs, said threshold voltage being said predetermined threshold.

22. The failure detection circuit of claim 21, wherein said bias voltage source provides a fixed threshold voltage to said comparator.

23. The failure detection circuit of claim 14, wherein said bias voltage source is arranged to receive a signal at a control input and to vary said threshold voltage in accordance with said signal such that said predetermined threshold can be varied to accommodate different values of said sensed parameter.

24. The failure detection circuit of claim 23, further comprising an operational amplifier which provides said signal to said control input in accordance with the difference between said regulated output voltage and a programmable reference voltage, said driver circuit arranged to vary the drive to said output transistors in response to the output of said comparator to regulate said output voltage.

25. A redundant power source comprising:
   a plurality of switching voltage regulators, the out-puts of which are connected in parallel to provide a common out-put voltage, each of said switching voltage regulators comprising:
      a clock generator which outputs a periodic clock signal,
      a driver circuit which, during each cycle of said clock signal, alternately drives upper and lower output transistors of a switching regulator on and off to conduct current to an output inductor to provide a regulated output voltage,
      a decision circuit connected to sense a parameter which, when said switching regulator is operating normally, transitions above and below a predetermined threshold during each cycle of said clock signal as said output transistors are driven on and off, and to produce a decision circuit output which toggles from a first state to a second state and back to said first state for every cycle of said clock signal as long as said sensed parameter transitions above and below said predetermined threshold during said clock cycle, and
      a counter having a clock input connected to receive said clock signal, a reset input connected to receive said decision circuit output, and a counter output, said counter arranged to count the clock cycles received at said clock input and to toggle said counter output when said counter has counted from an initial value to a predetermined count value, said counter reset to said initial value when said decision circuit output toggles from said first state to said second state,
      said counter toggling its output when said decision circuit output fails to toggle for a consecutive number of clock cycles equal to said predetermined count minus said initial value, said counter output thereby indicating when said sensed parameter failed to transition above and below said predetermined threshold during a clock cycle for a consecutive number of clock cycles equal to said predetermined count minus said initial value,
   said plurality of counter outputs thereby indicating the occurrence of a failure in their respective switching voltage regulators.

26. A method of detecting an output current failure for a switching voltage regulator, comprising the steps of:
   generating a periodic clock signal,
   sensing the current in the first of two output transistors of a switching voltage regulator which is driven on and off during each cycle of said clock signal to conduct current to an output inductor to provide a regulated output voltage, said sensed current transitioning above and below a predetermined threshold as said output transistor is driven on and off when said switching regulator is operating normally,
   determining if said sensed current transitions above and below said predetermined threshold during each cycle of said clock signal,
   counting the cycles of said clock signal,
   generating a failure signal when a predetermined number of cycles have been counted, and
   resetting said cycle count to zero once per clock cycle when said sensed current transitions above and below said predetermined threshold during said cycle,
   said failure signal thereby indicating when said sensed current failed to transition above and below said predetermined threshold during a clock cycle for a consecutive number of clock cycles equal to said predetermined number.

27. The method of claim 26, wherein said current is sensed by connecting a resistor in series with the current circuit of said output transistor and sensing the voltage across said resistor.

28. The method of claim 27, wherein said step of determining if said sensed current transitions above and below said predetermined threshold comprises the steps of:
   comparing said voltage sensed across said resistor with a bias voltage, and
   toggling an output signal from a first state to a second state when said sensed voltage transitions from above to below said predetermined threshold and toggling said output from said second state to said first state when said sensed voltage transitions from below to above said predetermined threshold.

29. The method of claim 28, wherein said cycle count is reset to zero when said output signal toggles from said first state to said second state.

30. The method of claim 26, wherein said clock cycles are counted with a counter and said failure signal is generated when said counter overflows.

* * * * *